United States Patent
Huang et al.

(10) Patent No.: US 11,051,291 B2
(45) Date of Patent: Jun. 29, 2021

(54) DATA TRANSMISSION METHODS, NETWORK DEVICE, AND TERMINAL DEVICE

(71) Applicant: HUAWEI TECHNOLOGIES CO., LTD., Shenzhen (CN)

(72) Inventors: Wenwen Huang, Shanghai (CN); Hao Tang, Shanghai (CN); Fan Wang, Berkshire (GB); Zhenfei Tang, Ottawa (CA); Junchao Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 16/579,965

(22) Filed: Sep. 24, 2019

(65) Prior Publication Data

US 2020/0029319 A1    Jan. 23, 2020

Related U.S. Application Data (63) Continuation of application No. PCT/CN2018/080265, filed on Mar. 23, 2018.

(30) Foreign Application Priority Data

Mar. 24, 2017    (CN) .......................... 201710183895.0

(51) Int. Cl.
*H04W 72/04* (2009.01)
*H04L 5/00* (2006.01)
*H04W 72/12* (2009.01)

(52) U.S. Cl.
CPC ......... *H04W 72/042* (2013.01); *H04L 5/0053* (2013.01); *H04W 72/0453* (2013.01); *H04W 72/1289* (2013.01)

(58) Field of Classification Search
CPC ........... H04W 72/042; H04W 72/0453; H04W 72/1289; H04L 5/0053
See application file for complete search history.

(56) References Cited

U.S. PATENT DOCUMENTS

2015/0256403 A1    9/2015  Li et al.
2016/0178253 A1    6/2016  Katoh et al.
(Continued)

FOREIGN PATENT DOCUMENTS

CN    101202578 A    6/2008
CN    102957500 A    3/2013
(Continued)

*Primary Examiner* — Omar J Ghowrwal
(74) *Attorney, Agent, or Firm* — Maier & Maier, PLLC (57) ABSTRACT

Embodiments described provide a data transmission method, a network device, and a terminal device. The method includes: sending, by a network device, control information corresponding to target data to a terminal device on a control resource, where the control resource and a data resource have a correspondence, and the control resource is used by the terminal device to determine the data resource on which the target data is received; and sending, by the network device based on the correspondence, the target data to the terminal device on the data resource. In the embodiments, after sending the control information corresponding to the target data on the control resource, the network device can send the target data on the data resource based on the correspondence between the control resource and the data resource, so that terminal devices having different bandwidth capabilities are able to receive the target data.

15 Claims, 5 Drawing Sheets

(56) References Cited

U.S. PATENT DOCUMENTS

| | | | |
|---|---|---|---|
| 2017/0041829 A1 | 2/2017 | Dai et al. | |
| 2017/0135105 A1* | 5/2017 | Li | H04W 72/12 |
| 2018/0176940 A1* | 6/2018 | Xu | H04W 28/16 |
| 2018/0227908 A1* | 8/2018 | Wang | H04L 5/0055 |
| 2018/0317221 A1* | 11/2018 | Yasukawa | H04W 72/0413 |
| 2019/0357226 A1* | 11/2019 | Lin | H04W 72/085 |

FOREIGN PATENT DOCUMENTS

| | | |
|---|---|---|
| CN | 103716841 A | 4/2014 |
| CN | 105025574 A | 11/2015 |
| CN | 105813202 A | 7/2016 |
| EP | 1890498 A1 | 2/2008 |
| EP | 2560443 A2 | 2/2013 |
| EP | 2741539 A1 | 6/2014 |
| EP | 2947938 A1 | 11/2015 |
| EP | 3116276 A1 | 1/2017 |
| WO | 2015/018361 A1 | 2/2015 |

* cited by examiner

DATA TRANSMISSION METHODS, NETWORK DEVICE, AND TERMINAL DEVICE

CROSS-REFERENCE TO RELATED APPLICATIONS

This application is a continuation of International Application No. PCT/CN2018/080265, filed on Mar. 23, 2018, which claims priority to Chinese Patent Application No. 201710183895.0, filed on Mar. 24, 2017. The contents of the aforementioned applications are hereby incorporated by reference in their entireties.

FIELD

This application relates to the communications field, and in particular, to a data transmission method, a network device, and a terminal device.

BACKGROUND

A new radio (NR) system can support relatively high carrier bandwidth. Maximum carrier bandwidth can reach 400 MHz, and new radio also can support terminal devices having different capabilities in operating at the same time. The different capabilities of the terminal devices may be different minimum bandwidth capabilities supported by the terminal devices; that is, the terminal devices at least need to support different bandwidth capabilities.

Both a network device and a terminal device in a long term evolution (LTE) system support a plurality of carrier bandwidths. However, both the network device and the terminal device in LTE support a carrier bandwidth of at least 20 MHz. A control channel may be transmitted in full bandwidth, and a data channel may also be transmitted in full bandwidth. However, new radio also supports terminal devices having different capabilities in operating at the same time. A terminal device with a relatively small bandwidth capability cannot correctly receive data in relatively high carrier bandwidth. For example, a terminal device has a minimum bandwidth capability of 5 MHz, a carrier bandwidth is 100 MHz, but the bandwidth capability does not reach 100 MHz, and if a network device sends data in 100 MHz bandwidth, the terminal device cannot correctly receive the data.

SUMMARY

This application provides a data transmission method, a network device, and a terminal device, so that a terminal device whose capability is less than carrier bandwidth can correctly receive data.

According to a first aspect, embodiments of this application provide a data transmission method. The method includes: sending, by a network device, control information corresponding to target data to a terminal device on a control resource, where the control resource and a data resource have a correspondence, and the control resource is used by the terminal device to determine the data resource on which the target data is received; and sending, by the network device based on the correspondence, the target data to the terminal device on the data resource.

The network device sends the control information corresponding to the target data on the control resource, and a position of the control resource and a position of the data resource used to send the target data have a correspondence, so that the network device may determine the data resource based on the correspondence and send the target data on the data resource. Correspondingly, the terminal device may also determine the data resource based on the correspondence, to receive the target data on the data resource. In a conventional solution, because a network device sends data to a terminal device by occupying carrier bandwidth, the terminal device whose capability is less than the carrier bandwidth cannot correctly receive the data. Compared with the conventional solution, a percentage of correct data transmission is improved in the embodiments of this application.

In a possible embodiment, the control resource and a data resource have a correspondence that includes: positions of the data resource and the control resource overlap in frequency domain.

The positions of the data resource and the control resource overlap in frequency domain. For example, a bandwidth size of the data resource may be greater than or equal to a bandwidth size of the control resource, so that latency caused by radio frequency chain switching of the network device and the terminal device can be avoided.

In another possible embodiment, the control resource and a data resource have a correspondence that includes: a starting position of the data resource is the same as a starting position of the control resource; or a central position of the data resource is the same as a central position of the control resource; or an end position of the data resource is the same as an end position of the control resource.

If the starting position, the central position, or the end position of the control resource is the same as the starting position, the central position, or the end position of the data resource, respectively, the network device implicitly indicates a position relationship between the data resource and the control resource by using the control resource. In this way, the network device does not need additional signaling to notify the terminal device, thereby saving signaling overheads.

In another possible design, before the sending of the target data to the terminal device on the data resource, the method further includes: sending, by the network device, indication information to the terminal device, where the indication information is used to indicate an offset value between a central position of the data resource and a central position of the control resource; or sending, by the network device, indication information to the terminal device, where the indication information is used to indicate an offset value between a starting position of the data resource and a starting position of the control resource; or sending, by the network device, indication information to the terminal device, where the indication information is used to indicate an offset value between an end position of the data resource and an end position of the control resource.

The network device may explicitly indicate a position relationship between the data resource and the control resource, thereby improving flexibility of resource allocation.

In another possible embodiment, the sending, by the network device, of indication information to the terminal device includes: sending, by the network device, downlink control information (DCI), where the DCI carries the indication information; or sending, by the network device, a master information block (MIB) instruction, where the MIB instruction carries the indication information.

The network device may add the indication information to the DCI or the MIB instruction. The indication information is used to indicate a correspondence between a data resource for transmitting a common message or user-specific data and a control resource. The indication information does not need to be specially sent, thereby saving power consumption of the network device.

In another possible embodiment, the sending, by the network device, of indication information to the terminal device includes: sending, by the network device, radio resource control (RRC) signaling, where the RRC signaling carries the indication information; or sending, by the network device, media access control control element (MAC CE) signaling, where the MAC CE signaling carries the indication information.

The network device may carry the indication information by using the RRC signaling or the MAC CE signaling. The indication information is used to indicate the correspondence between a data resource for transmitting user-specific data and a control resource. The indication information does not need to be specially sent, thereby saving power consumption of the network device.

In another possible embodiment, the indication information is further used to indicate a data transmission bandwidth size.

The network device may add, to the DCI or the MIB instruction, the indication information indicating a bandwidth size for transmitting a common message or user-specific data, or may add, to the RRC signaling or MAC CE signaling, indication information indicating a bandwidth size for transmitting a common message or user-specific data. In this way, transmission resources can be fully used, and resource utilization can be improved.

In another possible embodiment, the control resource includes common search space (CSS), and the common message includes at least a system information block (SIB).

In another possible embodiment, the first data is user-specific data, and the control resource includes user equipment (UE)-specific search space (USS).

According to a second aspect, embodiments of this application provide a data transmission method. The method includes: receiving, by a terminal device on a control resource, control information that is sent by a network device and corresponds to target data, where the control resource and a data resource have a correspondence; and receiving, by the terminal device on the data resource and based on the correspondence, the target data sent by the network device.

The terminal device receives the control information on the control resource, determines the data resource based on the correspondence between the control resource and the data resource, and receives the target data on the data resource, so that a terminal device whose capability is less than carrier bandwidth can receive target data in carrier bandwidth.

In a possible embodiment, that the control resource and a data resource have a correspondence includes: positions of the data resource and the control resource overlap in frequency domain.

The positions of the data resource and the control resource overlap in frequency domain. For example, a bandwidth size of the data resource may be greater than or equal to a bandwidth size of the control resource, so that latency caused by radio frequency chain switching of the network device and the terminal device can be avoided.

In another possible embodiment, the control resource and a data resource have a correspondence that includes: a starting position of the data resource is the same as a starting position of the control resource; or a central position of the data resource is the same as a central position of the control resource; or an end position of the data resource is the same as an end position of the control resource.

If the starting position, the central position, or the end position of the control resource is the same as the starting position, the central position, or the end position of the data resource, respectively, the terminal device implicitly indicates a position relationship between the data resource and the control resource by using the control resource. In this way, the network device does not need additional signaling to notify the terminal device, thereby saving signaling overheads.

In another possible embodiment, before the receiving, on the data resource, of the target data sent by the network device, the method further includes: receiving, by the terminal device, indication information sent by the network device, where the indication information is used to indicate an offset value between a central position of the data resource and a central position of the control resource; or receiving, by the terminal device, indication information sent by the network device, where the indication information is used to indicate an offset value between a starting position of the data resource and a starting position of the control resource; or receiving, by the terminal device, indication information sent by the network device, where the indication information is used to indicate an offset value between an end position of the data resource and an end position of the control resource.

The terminal device may receive a position relationship that is between the data resource and the control resource and that is explicitly indicated by the network device, thereby improving flexibility of system resource allocation.

In another possible embodiment, the receiving, by the terminal device, of indication information sent by the network device includes: receiving, by the terminal device, downlink control information DCI information, where the DCI information carries the indication information; or receiving, by the terminal device, a master information block MIB instruction, where the MIB instruction carries the indication information.

The terminal device may receive the indication information carried by the DCI or the MIB instruction. The indication information is used to indicate a correspondence between a data resource for transmitting a common message or user-specific data and a control resource. The indication information does not need to be specially sent, thereby saving power consumption of the network device.

In another possible embodiment, the receiving, by the terminal device, of indication information sent by the network device includes: receiving, by the terminal device, RRC signaling, where the RRC signaling carries the indication information; or receiving, by the terminal device, MAC CE signaling, where the MAC CE signaling carries the indication information.

The terminal device may receive the indication information carried by the RRC signaling or the MAC CE signaling. The indication information is used to indicate a correspondence between a data resource for transmitting user-specific data and a control resource. The indication information does not need to be specially sent, thereby saving power consumption of the network device.

In another possible embodiment, the indication information is further used to indicate a bandwidth size for transmitting the data.

The terminal device may receive the indication information that indicates a bandwidth size for transmitting a common message or user-specific data and that is carried by the DCI or the MIB instruction, or may receive indication information that indicates a bandwidth size for transmitting a common message or user-specific data and that is carried by the RRC signaling or the MAC CE signaling. In this way, transmission resources can be fully used and resource utilization can be improved.

In another possible embodiment, the control resource includes CSS, and the common message includes at least a SIB.

In another possible design, the first data is user-specific data, and the control resource includes USS.

According to a third aspect, a network device is provided. The network device includes a module configured to perform the method according to any one of the first aspect or possible implementations of the first aspect.

According to a fourth aspect, a terminal device is provided. The terminal device includes a module configured to perform the method according to any one of the second aspect or possible implementations of the second aspect.

According to a fifth aspect, a system is provided. The system includes: the network device according to the third aspect and the terminal device according to the fourth aspect.

According to a sixth aspect, a network device is provided. The network device includes a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method according to any one of the first aspect or possible implementations of the first aspect.

According to a seventh aspect, a terminal device is provided. The terminal device includes a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method according to any one of the second aspect or possible implementations of the second aspect.

According to an eighth aspect, a computer storage medium is provided. The computer storage medium stores a program code. The program code is used to perform the method according to any one of the first aspect or possible implementations of the first aspect.

According to a ninth aspect, a computer storage medium is provided. The computer storage medium stores a program code, and the program code is used to perform the method according to any one of the second aspect or possible implementations of the second aspect.

Based on the foregoing technical solutions, the network device sends, on the control resource, the control information corresponding to target data, and the control resource and the data resource used to send the target data have the correspondence, so that the network device may determine the data resource based on the correspondence and send the target data on the data resource. In a conventional solution, because a network device sends data to a terminal device by occupying full carrier bandwidth, the terminal device whose capability is less than the carrier bandwidth cannot correctly receive the data. Compared with conventional solutions, a percentage of correct data transmission is improved in the embodiments of this application.

DETAILED DESCRIPTION OF THE EMBODIMENTS

The following describes technical solutions of this application with reference to accompanying drawings.

The technical solutions in the embodiments of this application may be applied to various communications systems, such as a global system for mobile communications, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX™) communications system, a future 5th generation (5th Generation, 5G) system, or an NR system.

Particularly, the technical solutions in the embodiments of this application can be applied to various communications systems that are based on a non-orthogonal multiple access technology, such as a sparse code multiple access (SCMA) system and a low density signature (LDS) system. For example, the SCMA system and the LDS system may also have other names in the communications field. Further, the technical solutions in the embodiments of this application can be applied to a multicarrier transmission system using the non-orthogonal multiple access technology, such as an orthogonal frequency division multiplexing (OFDM) system using the non-orthogonal multiple access technology, a filter bank multicarrier (FBMC) system, a generalized frequency division multiplexing (GFDM) system, or a filtered orthogonal frequency division multiplexing (Filtered-OFDM, F-OFDM) system.

A terminal device in the embodiments of this application may be UE, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this application.

A network device in the embodiments of this application may be a device configured to communicate with a terminal device. The network device may be a base transceiver station (BTS) in global system for mobile communications (GSM) or CDMA, a NodeB (NB) in a WCDMA system, an evolved NodeB (eNB or eNodeB) in an LTE system, or a radio controller in a cloud radio access network (CRAN) scenario. Alternatively, the network device may be a relay station, an access point, an in-vehicle device, a wearable device, a network device in a future 5G network, a network device in a future evolved PLMN network, or the like. This is not limited in the embodiments of this application.

Figure 1:
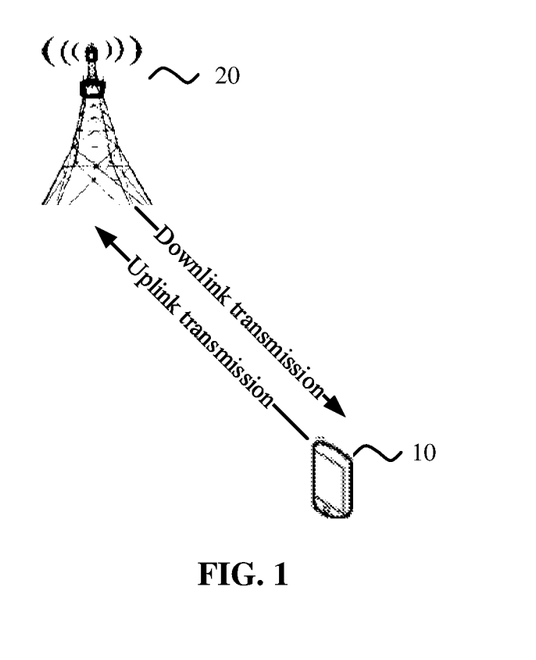
FIG. 1 is a schematic diagram of an application scenario according to embodiments described herein.

FIG. 1 is a schematic diagram of an application scenario according to this application. A communications system in FIG. 1 may include a terminal device 10 and a network device 20. The network device 20 is configured to provide a communications service for the terminal device 10 and access a core network. The terminal device 10 accesses a network by searching for a synchronization signal, a broadcast signal or the like sent by the network device 20, to communicate with the network. Arrows shown in FIG. 1 may represent uplink/downlink transmission performed by using a cellular link between the terminal device 10 and the network device 20.

Transmission content of a data channel in NR may be a common message and/or user data. The common message includes an SIB, a paging message, and an RRC message. A control channel in NR carries control information corresponding to the transmission content of the data channel, for example, a modulation and coding scheme ( ) and the control channel in NR includes two parts, CSS and USS. The CSS is used to carry common control information of a cell, and the USS is used to carry user-specific control information.

It should be understood that names of "CSS" and "USS" in the various embodiments of this application are used as an example for description, but the names are not limited. Specific implementation is determined based on a function of search space.

NR can support relatively high carrier bandwidth. For example, the carrier bandwidth can reach 400 MHz, and NR also can support terminal devices having different capabilities in operating at the same time. The different capabilities of the terminal devices may be different minimum bandwidth capabilities supported by the terminal devices, that is, the terminal devices at least need to support different bandwidth capabilities.

Figure 2:
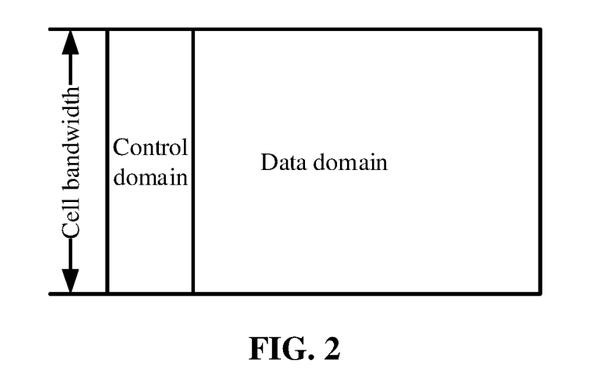
FIG. 2 is a schematic diagram of data transmission in a conventional solution.

As shown in FIG. 2, both a network device and a terminal device in LTE support a bandwidth of 20 MHz. For example, a control channel may be transmitted in a control domain in full bandwidth, and for example, a data channel may be transmitted in data domain in full bandwidth. However, NR also supports terminal devices having different capabilities in operating at the same time. For terminal devices having relatively small bandwidth capabilities, that is, the terminal devices whose bandwidth does not reach 100 MHz, if the network device sends a common message in a bandwidth of 100 MHz, the terminal devices cannot correctly receive the common message.

Figure 3:
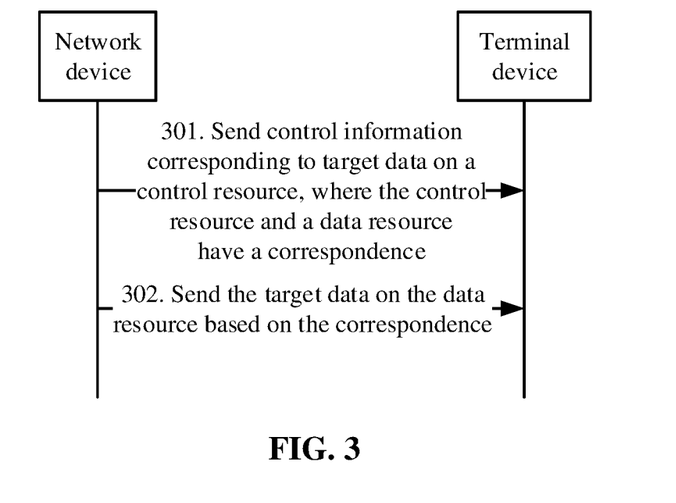
FIG. 3 is a schematic flowchart of data transmission according to an embodiment described herein.

FIG. 3 is a schematic flowchart of a method for data channel transmission according to an embodiment of this application. The method may be performed by a network device.

In 301, the network device sends control information corresponding to target data on a control resource, where the control resource and a data resource used to send the target data have a correspondence. Correspondingly, a terminal device receives the control information corresponding to the target data on the control resource.

The correspondence between the control resource and the data resource may be a correspondence between a position of the control resource and a position of the data resource. The control resource on which the network device sends the control information may be preconfigured by a system for the control information. The terminal device may learn of the control resource based on a manner that is preconfigured with the network device, or learn of the control resource by using a received synchronization signal block (SSB). This is not limited in this application.

It should be understood that the SSB may be used by the terminal device and the network device to transmit a broadcast signal or a synchronization signal.

Optionally, if the target data is a common message, a corresponding control resource includes common search space. If the target data is user-specific data, a corresponding control resource includes UE-specific search space. In the following embodiments, unless otherwise specified, the target data may be a common message or user-specific data.

Optionally, if the target data is a common message, the common message may further include a first SIB.

For example, the first SIB may include a plurality of SIBs, for example, SIB 1, SIB 2, . . . , and SIB x, and content carried by the plurality of SIBs is different. For example, SIB 1 is used to carry information about another SIB, for example, a period of transmission, and SIB 2 is used to carry information related to a preamble (preamble) in a random access process.

Optionally, the common message may further include a paging message, anRRC message, and the like. This is not limited in this application.

Optionally, the correspondence may be separately preset by the network device and the terminal device. Alternatively, the network device sends, to the terminal device, signaling or a message that carries the correspondence between the control resource and the data resource, and the terminal device obtains the correspondence from the signaling or the message.

In 302, the network device sends the target data on the data resource based on the correspondence. Correspondingly, the terminal device receives the target data on the data resource.

The network device sends the control information corresponding to the target data on the control resource, where the position of the control resource and the position of the data resource used to send the target data have the correspondence. In this case, the network device may determine the position of the data resource based on the correspondence. In addition, the network device and the terminal device may preconfigure a data transmission bandwidth size. The network device may determine the data resource based on the data transmission bandwidth size and the position of the data resource, and send the target data on the data resource.

Similarly, the terminal device receives the control information on the control resource, determines the data resource based on the correspondence between the control resource and the data resource, and receives the target data on the data resource, so that a terminal device whose capability is less than carrier bandwidth can correctly receive the target data.

It should be understood that the carrier bandwidth in the embodiments of this application may also be referred to as "system bandwidth" or "channel bandwidth". This is not limited in this application.

Optionally, if the target data is user-specific data, the method may be applied to a system including a plurality of terminal devices and a network device. Bandwidths in which different terminal devices receive data may be the same, or may be different, that is, the bandwidths in which the network device sends data to the different terminal devices may be different. For a bandwidth size for data transmission between the network device and a terminal device, a bandwidth size that can be supported by the terminal device should be considered; that is, a data transmission bandwidth size should be less than or equal to the bandwidth size supported by the terminal device. Alternatively, the network device may set a data transmission bandwidth size to correspond to a minimum value of bandwidths supported by the plurality of terminal devices. This is not limited in this application.

Optionally, the data resource may include the control resource. For example, the correspondence between the control resource and the data resource may be specifically that a position of the control resource in frequency domain overlaps a position of the data resource in frequency domain. In this way, latency caused by radio frequency chain (RF chain) switching of the network device and the terminal device can be avoided.

It should be understood that a bandwidth size of the control resource and a bandwidth size of the data resource may be configured separately or uniformly, and the bandwidth size of the control resource and the bandwidth size of the data resource may be the same or may be different. This is not limited in this application.

Optionally, the correspondence between the data resource and the control resource may alternatively be predefined by a system, that is, the network device implicitly indicates a position relationship between the data resource and the control resource by using the control resource. In this way, the network device does not need additional signaling to notify the terminal device, thereby saving signaling overheads.

Figure 4:
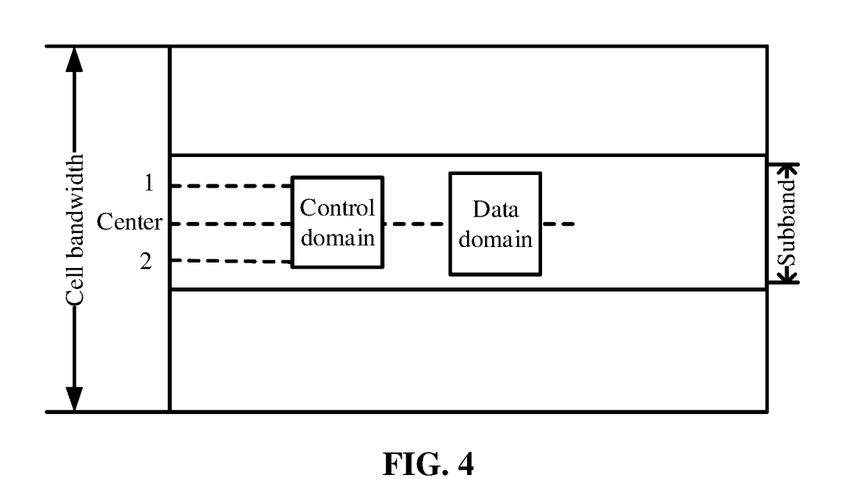
FIG. 4 is a schematic diagram of data transmission according to an embodiment described herein.

For example, the network device and the terminal device may predefine that a central position of the data resource is the same as a central position of the control resource, as shown in FIG. 4. In other words, the central position of the data resource is aligned with the central position of the control resource. That is, a resource block number of the central position of the control resource is Nctrl_center, and a resource number of the central position of the data resource is also represented as Nctrl_center. The resource block number is merely used to describe an example in the embodiments of the present invention. For example, the resource may also be in another representation form, such as a number, a resource name, or an identifier. The embodiments described herein are not limited thereto. In this way, the network device knows the central position of the control resource, determines the central position of the data resource, and sends the target data on the data resource. Correspondingly, the terminal device can also completely receive the target data on the data resource.

It should be noted that the system may use a data transmission bandwidth size predefined by the terminal device and the network device as a sub-band size. In this way, after the control resource is determined, a position of the sub-band may be determined.

It should be understood that a time domain position corresponding to the data resource and a time domain position corresponding to the control resource may be different.

Optionally, the network device and the terminal device may predefine that a starting position of the data resource is the same as a starting position of the control resource. As shown in FIG. 4, the starting position of the control resource may be a position 1 or may be a position 2.

It should be noted that if a sub-band size is different from a data transmission bandwidth size, for example, the sub-band size is greater than the data transmission bandwidth size, a position of the corresponding data transmission bandwidth may be determined in a sub-band.

Optionally, the network device and the terminal device may predefine that an end position of the data resource is the same as an end position of the control resource. As shown in FIG. 4, an end position of the control resource may be a position 1 or may be a position 2.

Optionally, the correspondence between the control resource and the data resource may be a correspondence between a first position of the control resource and a second position of the data resource.

For example, the network device and the terminal device predefine that the central position of the data resource is the same as the end position of the control resource; or predefine that the end position of the data resource is the same as the starting position of the control resource; or predefine that the starting position of the data resource is the same as the central position of the control resource. That is, the first position may be any one of the central position, the starting position, and the end position of the control resource, and the second position may also be any one of the central position, the starting position, and the end position of the data resource. The terminal device may determine the data resource based on the control resource by using any one of the foregoing combinations. This is not limited in this application.

Optionally, the network device and the terminal device may alternatively predefine that another position of the data resource is the same as another position of the control resource, so that the terminal device may determine the data resource after learning of a position of the control resource. This is not limited in this application.

Optionally, the network device may explicitly indicate a position relationship between the data resource and the control resource, thereby improving flexibility of resource allocation.

For example, if the target data is a common message, the network device may indicate the correspondence between the control resource and the data resource by sending MIB signaling or DCI. For example, the network device may add indication information to the MIB signaling and/or the DCI. The indication information may indicate an offset value between a central position of the control resource and a central position of the data resource. In this case, after receiving the indication information and knowing the central position of the control resource, the terminal device determines a central position of a frequency domain resource for data transmission, and may determine the data resource based on the central position of the frequency domain resource for data transmission and a preset data transmission bandwidth size, thereby receiving the target data on the data resource.

It should be understood that the MIB signaling is signaling transmitted through a broadcast channel.

It should be noted that if the target data is a common message, the control resource includes CSS.

If the target data is user-specific data, the network device may add indication information indicating the correspondence between the control resource and the data resource to RRC signaling or DCI. A specific process is the same as an indication manner of the common message. To avoid repetition, details are not described herein again.

It should be noted that if the target data is user-specific data, the control resource includes USS.

Figure 5:
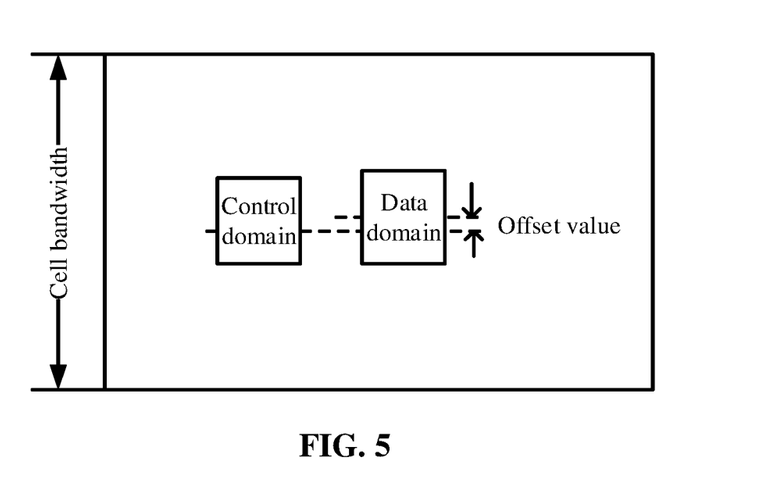
FIG. 5 is another schematic diagram of data transmission according to an embodiment described herein.

For example, as shown in FIG. 5, the central position of the data resource may be determined by the central position of the control resource and an offset value (offset value), and the data resource is determined based on the data transmission bandwidth size.

In this embodiment, a PRB index may also be used to indicate a position of data transmission bandwidth, where the PRB is a PRB that corresponds to a subcarrier spacing by default. For example, PRB indexes of entire carrier bandwidth are 0, 1, 2, . . . , and the network device indicates a PRB index of a central position of data transmission bandwidth in carrier bandwidth. Alternatively, the network device may indicate a PRB index of a starting position of data transmission bandwidth in carrier bandwidth; or indicate a PRB index of an end position of data transmission bandwidth in carrier bandwidth.

Optionally, a central position of a frequency domain resource is used as an example. If the bandwidth size of the data resource is c, and the bandwidth size of the control resource is d, a value range of the offset value may be [(d−c)/2, (c−d)/2].

Optionally, the indication information may alternatively indicate an offset value between a starting position of the control resource and a starting position of the data resource.

Optionally, the indication information may alternatively indicate an offset value between an end position of the control resource and an end position of the data resource.

Optionally, the indication information may alternatively indicate that a starting position of the data resource is the same as a starting position of the control resource.

Optionally, the indication information may alternatively indicate that an end position of the data resource is the same as an end position of the control resource.

Optionally, the indication information may alternatively indicate that a central position of the data resource is the same as a central position of the control resource.

Optionally, the network device may send the indication information to the terminal device based on a position relationship between the control resource and the data resource. The indication information may indicate a starting position, an end position, or a central position of the data resource.

Figure 6:
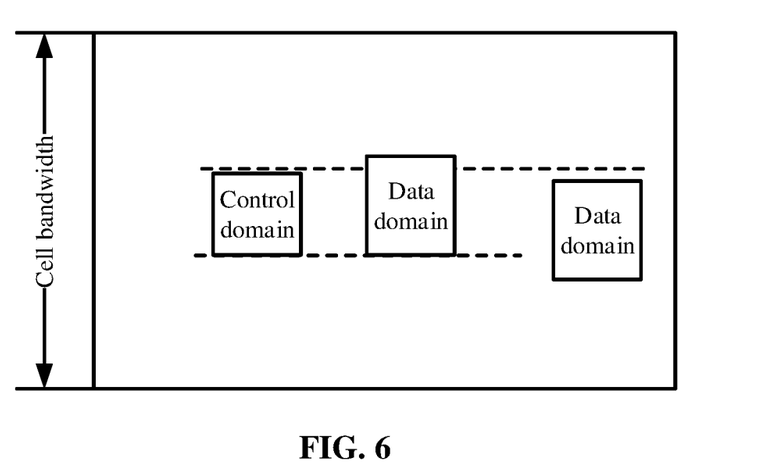
FIG. 6 is still another schematic diagram of data transmission according to an embodiment described herein.

Optionally, as shown in FIG. 6, if the data resource includes the control resource, m is a frequency-domain end position of the control resource, n is a frequency-domain starting position of the control resource, and k is a bandwidth size of the data resource, a value range of a frequency-domain starting position of the data resource is [m−k, n].

Optionally, if the target data is user-specific data, the data transmission bandwidth size may be indicated by using a MIB instruction and/or DCI information, or may be indicated by using a MAC CE c. When there is a relatively small quantity of data resources, data transmission bandwidth is flexibly adjusted.

Therefore, based on the data transmission method in the embodiments of this application, the network device sends the control information corresponding to the target data on the control resource, and the control resource and the data resource used to send the target data have the correspondence. In this case, the network device may determine the data resource based on the correspondence and send the target data on the data resource, so that a terminal device whose capability is less than carrier bandwidth correctly receives data.

Figure 7:
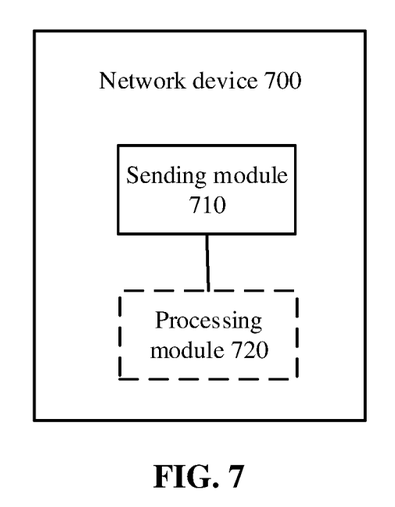
FIG. 7 is a schematic block diagram of a network device according to an embodiment described herein.

FIG. 7 is a schematic block diagram of a network device 700 according to an embodiment of this application. As shown in FIG. 7, the network device 700 includes:

a sending module 710 configured to send, to a terminal device, control information corresponding to target data on a control resource, where the control resource and a data resource have a correspondence, and the control resource is used by the terminal device to determine the data resource on which the target data is received, where the sending module 710 is further configured to send, based on the correspondence, the target data to the terminal device on the data resource.

Optionally, the network device 700 may further include a processing module 720 configured to set the correspondence between the control resource and the data resource. Alternatively, the sending module 710 is further configured to notify the terminal device of signaling or a message carrying the correspondence between the control resource and the data resource, so that the terminal device obtains the correspondence from the signaling or the message.

Optionally, that the control resource and a data resource have a correspondence includes: positions of the data resource and the control resource overlap in frequency domain.

Optionally, that the control resource and a data resource have a correspondence includes: a starting position of the data resource is the same as a starting position of the control method resource; or a central position of the data resource is the same as a central position of the control resource; or an end position of the data resource is the same as an end position of the control resource. Optionally, the sending module is further configured to send indication information to the terminal device, where the indication information is used to indicate an offset value between a central position of the data resource and a central position of the control resource; or the sending module is further configured to send indication information to the terminal device, where the indication information is used to indicate an offset value between a starting position of the data resource and a starting position of the control resource; or the sending module is further configured to send indication information to the terminal device, where the indication information is used to indicate an offset value between an end position of the data resource and an end position of the control resource.

Optionally, the sending module 710 is configured to: send DCI, where the DCI carries the indication information; or send a MIB instruction, where the MIB instruction carries the indication information.

Optionally, the sending module 710 is specifically configured to: send RRC signaling, where the RRC signaling carries the indication information; or send MAC CE signaling, where the MAC CE signaling carries the indication information.

Optionally, the indication information is further used to indicate a data transmission bandwidth size.

Therefore, in the embodiments of this application, the network device sends the control information corresponding to the target data on the control resource, and a position of the control resource and a position of the data resource used to send the target data have a correspondence, so that the network device may determine the data resource based on the correspondence and send the target data on the data resource. In a conventional solution, because a network device sends data to a terminal device by occupying full carrier bandwidth, the terminal device whose capability is less than the carrier bandwidth cannot correctly receive the data. Compared with conventional solutions, a percentage of correct data transmission is improved in the embodiments of this application.

It should be understood that, the network device 700 in the embodiments of this application may correspond to the network device in the data transmission method 300 in the embodiments of this application, and the foregoing management operations and/or functions and other management operations and/or functions of modules of the network device 700 are intended to implement corresponding steps of the foregoing methods. For brevity, details are not described herein again.

Figure 8:
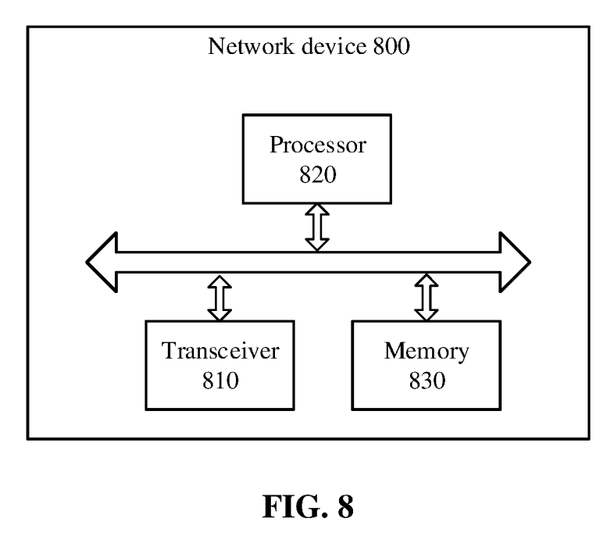
FIG. 8 is a schematic block diagram of a network device according to an embodiment described herein.

The sending module 710 in this embodiment of this application may be implemented by a transceiver, and the processing module 720 may be implemented by a processor. As shown in FIG. 8, a network device 800 may include a transceiver 810, a processor 820, and a memory 830. The memory 830 may be configured to store indication information, and may be further configured to store code, an instruction, and the like that are executed by the processor 820.

Figure 9:
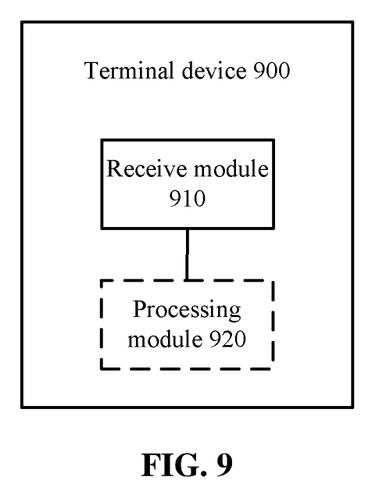
FIG. 9 is a schematic block diagram of a terminal device according to an embodiment described herein.

FIG. 9 is a schematic block diagram of a terminal device 900 according to an embodiment of this application. As shown in FIG. 9, the terminal device 900 includes:

a receive module 910, configured to receive, on a control resource, control information that is sent by a network device and corresponds to target data, where the control resource and a data resource have a correspondence, where the receive module 910 is further configured to receive, on the data resource and based on the correspondence, the target data sent by the network device.

Optionally, the terminal device 900 may further include a processing module 920, configured to set the correspondence between the control resource and the data resource. Alternatively, the receive module 910 is further configured to receive signaling or a message that notifies the terminal device of the correspondence between the control resource and the data resource, so that the terminal device obtains the correspondence from the signaling or the message.

Optionally, that the control resource and a data resource have a correspondence includes: Positions of the data resource and the control resource overlap in frequency domain.

Optionally, that the control resource and a data resource have a correspondence includes: a starting position of the data resource is the same as a starting position of the control resource; or a central position of the data resource is the same as a central position of the control resource; or an end position of the data resource is the same as an end position of the control resource.

Optionally, the receive module 910 is further configured to receive indication information sent by the network device, where the indication information is used to indicate an offset value between a central position of the data resource and a central position of the control resource; or the receive module 910 is further configured to receive indication information sent by the network device, where the indication information is used to indicate an offset value between a starting position of the data resource and a starting position of the control resource; or the terminal device receives the indication information sent by the network device, where the indication information is used to indicate an offset value between an end position of the data resource and an end position of the control resource.

Optionally, the receive module 910 is specifically configured to: receive DCI information, where the DCI information carries the indication information; or receive a MIB instruction, where the MIB instruction carries the indication information.

Optionally, the receive module 910 is specifically configured to: receive RRC signaling, where the RRC signaling carries the indication information; or MAC CE signaling, where the MAC CE signaling carries the indication information.

Optionally, the indication information is further used to indicate a data transmission bandwidth size.

Therefore, in the embodiments of this application, the network device receives the control information on the control resource, determines the data resource based on the correspondence between the control resource and the data resource, and receives the target data on the data resource. In a conventional solution, because a network device sends data to a terminal device by occupying full carrier bandwidth, the terminal device whose capability is less than the carrier bandwidth cannot correctly receive the data. Compared with the conventional solution, a percentage of correct data transmission is improved in the embodiments of this application.

It should be understood that, the terminal device 900 in this embodiment of this application may correspond to the terminal device in the data transmission method 300 in the embodiments of this application, and the foregoing management operations and/or functions and other management operations and/or functions of modules of the terminal device 900 are intended to implement corresponding steps of the foregoing methods. For brevity, details are not described herein again.

Figure 10:
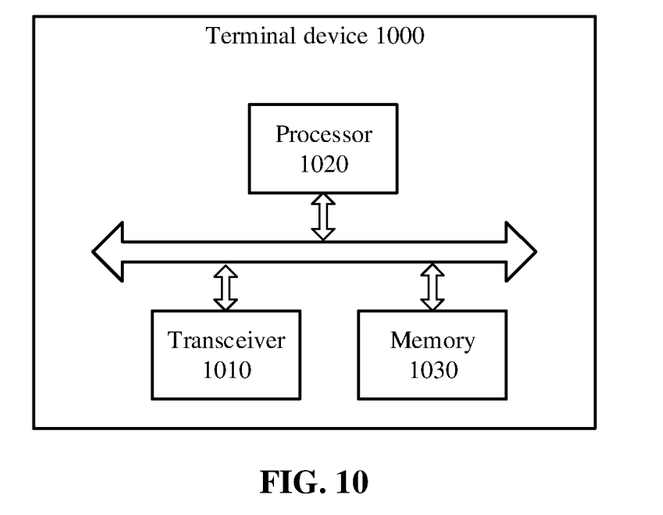
FIG. 10 is a schematic structural diagram of a terminal device according to an embodiment described herein.

The receive module 910 in this embodiment of this application may be implemented by a transceiver, and the processing module 920 may be implemented by a processor. As shown in FIG. 10, a terminal device 1000 may include a transceiver 1010, a processor 1020, and a memory 1030. The memory 1030 may be configured to store indication information, and may be further configured to store code, an instruction, and the like that are executed by the processor 1020.

It should be understood that the processor 820 or the processor 1020 may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or a transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory 830 or the memory 1030 in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synch Link DRAM, SLDRAM), and a direct rambus dynamic random access memory (Direct Rambus RAM, DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, references may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   sending, by a network device, control information corresponding to target data to a terminal device on a control resource, wherein the control resource and a data resource have a correspondence in a frequency domain, and the control resource is used by the terminal device to determine the data resource on which the target data is received; and
   sending, by the network device based on the correspondence, the target data to the terminal device on the data resource,
   wherein an offset value between the data resource and the control resource in the frequency domain is utilized so that the data resource is determined and the target data is obtained from the data resource, and the offset value is sent from the network device to the terminal before the target data is sent to the terminal.

2. The method according to claim 1, wherein the correspondence of the control resource and a data resource comprises:
   positions of the data resource and the control resource overlap in the frequency domain.

3. The method according to claim 1, wherein the correspondence of the control resource and a data resource comprises:
   a starting position of the data resource is the same as a starting position of the control resource; or
   a central position of the data resource is the same as a central position of the control resource; or
   an end position of the data resource is the same as an end position of the control resource.

4. The method according to claim 1, wherein before the sending of the target data to the terminal device on the data resource, the method further comprises:
sending, by the network device, indication information to the terminal device, wherein the indication information is used to indicate the offset value of the frequency domain between a central position of the data resource and a central position of the control resource; or
sending, by the network device, indication information to the terminal device, wherein the indication information is used to indicate the offset value of the frequency domain between a starting position of the data resource and a starting position of the control resource; or
sending, by the network device, indication information to the terminal device, wherein the indication information is used to indicate the offset value of the frequency domain between an end position of the data resource and an end position of the control resource.

5. The method according to claim 4, wherein the sending, by the network device, of the indication information to the terminal device comprises:
sending, by the network device, downlink control information (DCI), wherein the DCI carries the indication information; or
sending, by the network device, a master information block (MIB) instruction, wherein the MIB instruction carries the indication information.

6. A data transmission method, comprising:
receiving, by a terminal device on a control resource, control information that is sent by a network device and corresponds to target data, wherein the control resource and a data resource have a correspondence in a frequency domain; and
receiving, by the terminal device on the data resource and based on the correspondence, the target data sent by the network device,
wherein an offset value between the data resource and the control resource in the frequency domain is utilized so that the data resource is determined and the target data is obtained from the data resource, and the offset value is sent from the network device to the terminal before the target data is sent to the terminal.

7. The method according to claim 6, wherein the correspondence of the control resource and a data resource comprises:
positions of the data resource and the control resource overlap in the frequency domain.

8. The method according to claim 6, wherein the correspondence of the control resource and a data resource comprises:
a starting position of the data resource is the same as a starting position of the control resource; or
a central position of the data resource is the same as a central position of the control resource; or
an end position of the data resource is the same as an end position of the control resource.

9. The method according to claim 6, wherein before the receiving, on the data resource, of the target data sent by the network device, the method further comprises:
receiving, by the terminal device, indication information sent by the network device, wherein the indication information is used to indicate the offset value of the frequency domain between a central position of the data resource and a central position of the control resource; or
receiving, by the terminal device, indication information sent by the network device, wherein the indication information is used to indicate the offset value of the frequency domain between a starting position of the data resource and a starting position of the control resource; or
receiving, by the terminal device, indication information sent by the network device, wherein the indication information is used to indicate the offset value of the frequency domain between an end position of the data resource and an end position of the control resource.

10. The method according to claim 6, wherein the receiving, by the terminal device, of the indication information sent by the network device comprises:
receiving, by the terminal device, downlink control information DCI information, wherein the DCI information carries the indication information; or
receiving, by the terminal device, a master information block MIB instruction, wherein the MIB instruction carries the indication information.

11. A network device, comprising:
a memory, configured to store data and program; and
a transmitter, configured to send control information corresponding to target data to a terminal device on a control resource, wherein the control resource and a data resource have a correspondence in a frequency domain, and the control resource is used by the terminal device to determine the data resource on which the target data is received, wherein
the transmitter is further configured to send, based on the correspondence, the target data to the terminal device on the data resource,
wherein an offset value between the data resource and the control resource in the frequency domain is utilized so that the data resource is determined and the target data is obtained from the data resource, and the offset value is sent from the network device to the terminal before the target data is sent to the terminal.

12. The network device according to claim 11, wherein the correspondence of the control resource and a data resource comprises:
positions of the data resource and the control resource overlap in the frequency domain.

13. The network device according to claim 11, wherein the correspondence of the control resource and a data resource comprises:
a starting position of the data resource is the same as a starting position of the control method resource; or
a central position of the data resource is the same as a central position of the control resource; or
an end position of the data resource is the same as an end position of the control resource.

14. The network device according to claim 11, wherein the transmitter is further configured to send indication information to the terminal device, wherein the indication information is used to indicate the offset value of the frequency domain between a central position of the data resource and a central position of the control resource; or
the transmitter is further configured to send indication information to the terminal device, wherein the indication information is used to indicate the offset value of the frequency domain between a starting position of the data resource and a starting position of the control resource; or
the transmitter is further configured to send indication information to the terminal device, wherein the indication information is used to indicate the offset value of the frequency domain between an end position of the data resource and an end position of the control resource.

15. The network device according to claim 14, wherein the transmitter is configured to:
   send downlink control information (DCI), wherein the DCI carries the indication information; or
   send a master information block (MIB) instruction, wherein the MIB instruction carries the indication information.

* * * * *